US011503125B2

(12) United States Patent
Nassirzadeh

(10) Patent No.: US 11,503,125 B2
(45) Date of Patent: Nov. 15, 2022

(54) PLATFORM FOR ESTABLISHING COMMUNICATION AND INTERACTION BETWEEN USERS AND A METHOD THEREOF

(71) Applicant: Janet Nassirzadeh, Beverly Hills, CA (US)

(72) Inventor: Janet Nassirzadeh, Beverly Hills, CA (US)

(*) Notice: Subject to any disclaimer, the term of this patent is extended or adjusted under 35 U.S.C. 154(b) by 0 days.

(21) Appl. No.: 15/633,080

(22) Filed: Jun. 26, 2017

(65) Prior Publication Data

US 2017/0374173 A1 Dec. 28, 2017

Related U.S. Application Data

(60) Provisional application No. 62/354,474, filed on Jun. 24, 2016.

(51) Int. Cl.
| | |
|---|---|
| *G06Q 10/00* | (2012.01) |
| *H04L 67/306* | (2022.01) |
| *H04L 12/18* | (2006.01) |
| *G06Q 50/00* | (2012.01) |
| *G06T 19/00* | (2011.01) |
| *H04L 51/046* | (2022.01) |
| *H04L 51/52* | (2022.01) |

(52) U.S. Cl.
CPC ........... *H04L 67/306* (2013.01); *G06Q 50/01* (2013.01); *G06T 19/003* (2013.01); *H04L 12/1831* (2013.01); *H04L 51/046* (2013.01); *H04L 51/52* (2022.05)

(58) Field of Classification Search
CPC ... H04L 67/306; H04L 12/1831; H04L 51/52; G06Q 50/01; G06T 19/003
USPC .......................................................... 705/319
See application file for complete search history.

(56) References Cited

U.S. PATENT DOCUMENTS

| | | | | |
|---|---|---|---|---|
| 2009/0024741 | A1* | 1/2009 | Roach ................... | G06Q 10/10 709/225 |
| 2011/0209192 | A1* | 8/2011 | LeClerc Greer ........ | G06F 21/32 726/1 |
| 2011/0238755 | A1* | 9/2011 | Khan ..................... | G06Q 50/01 709/204 |
| 2013/0117296 | A1* | 5/2013 | Mizuguchi ........ | G06F 17/30386 707/758 |
| 2013/0137464 | A1* | 5/2013 | Kramer .................. | G06Q 30/02 455/456.3 |

(Continued)

*Primary Examiner* — Gabrielle A McCormick

(57) ABSTRACT

The present disclosure relates to a social network application that facilitates breaking the ice between users who are not acquainted from each other before. In one embodiment, the application comprises a non-transitory computer-readable storage medium comprising programmable instructions adapted to be executed on one or more processors, and to perform a method of: enabling each user to select one of multiple status modes at the platform server, where each status mode dictates a certain action or counteraction that can be taken by other user or users, and each status mode allows different level of communication to be established between the users; allowing the first user to send an alert to a second user displayed on a map and/or a list; allowing the second user to change his or her status mode towards the first user based on the alert; and allowing a two-way communication to be established between the first user and the second user.

12 Claims, 14 Drawing Sheets

(56) References Cited

U.S. PATENT DOCUMENTS

2016/0224767 A1* 8/2016 Steelberg ............... G06F 21/10

* cited by examiner

PLATFORM FOR ESTABLISHING COMMUNICATION AND INTERACTION BETWEEN USERS AND A METHOD THEREOF

CROSS-REFERENCE TO RELATED PATENT APPLICATIONS

Embodiments of the present invention relate to U.S. Provisional Application Ser. No. 62/354,474, filed Jun. 24, 2016, entitled "A PLATFORM FOR ESTABLISHING COMMUNICATION BETWEEN USERS AND A METHOD THEREOF", the contents of which are incorporated by reference herein in its entirety and which is a basis for a claim of priority.

FIELD OF THE DISCLOSURE

The present disclosure generally relates to a platform for establishing communication between its users. More specifically, the present disclosure provides a social network application that facilitates breaking the ice and communication between users who are not acquainted with each other from before.

BACKGROUND OF THE INVENTION

The popularity of social networking applications and websites has increased rapidly over the past few years. Social networking applications and websites benefit their users by helping them to connect with new people, share opinions with likeminded people, and stay in touch with old friends and colleagues. For instance, they give people an opportunity to meet new people around the world. Users of these applications or websites have access to millions of profiles from around the world. Before the advent of social networking sites, chat rooms were the only way to meet new people on the internet. However, the drawback of chat rooms was that you may not know the person with whom you are interacting with. The introduction of profiles on social networking applications and websites allowed people to know more information about a person before they interact with them.

However, many users of current social networking applications and websites have been in a situation where they have come across someone whom they are interested in, but either didn't get a chance to introduce themselves or been too shy to initiate a conversation. Often times the person in question is surrounded by others who make it even harder to approach, thereby missing the opportunity to know a person who may also be interested in getting to know them.

In addition, today's social interconnections are becoming more and more electronic, with the chat sites being the first form of communications between people after AOL's "Got Mail" in the early 90s. Many websites such as eHarmony and match.com are leading electronic applications that bring two people together. It also is apparent that texting has replaced phone calls. Timber®, Viber® and Whatsapp® are other forms of electronic applications that have emerged in the past few years and statistics about the usage of these apps are compelling.

Accordingly, there exists a need for an improved social networking application and platform that makes it easier to establish communication between users who are not acquainted from before and have no previous knowledge of each other. There also exists a need for an improved social networking application that facilitate breaking the ice between the users who do not know each other.

SUMMARY OF THE INVENTION

One objective of the present disclosure is to provide a platform and a method that facilitates communication between users who are not acquainted from before and have no previous knowledge of each other.

Another objective of the present disclosure is to provide a platform and a method that facilitates breaking the ice between users that may be in view site of each other and who may not have been acquainted from before.

Another objective of the present disclosure is to provide a platform and a method that facilitates users to be able to break the ice by first secretly admiring another.

Also, a method is provided for users to be able to define the nature of their interest in another, namely; Romance and Friendship, and to be able to switch between the two.

Further, a method is provided for users to interact with each other through Virtual Reality and Fantasy Scenarios.

In accordance with one embodiment of the present disclosure, a platform is disclosed comprising a non-transitory computer-readable storage medium comprising programmable instructions adapted to be executed on one or more processors, and to perform a method of: 1) allowing a plurality of users to register and create their own profiles on a platform server; 2) enabling each user to select one of multiple status modes at the platform server, where each status mode dictates a certain action or counteraction that can be taken by other user or users, and each status mode allows different level of communication to be established between the users; 3) allowing the user to select one of two function modes at the platform server, where each function mode establishes the nature of interaction between two users; 4) allowing each user to select whether he or she can be detected by others; 5) allowing a first user to select criteria of users he or she wants to break ice with; 6) detecting users who can be detected and who meet the first user's selected criteria within a specified range or condition and displaying them on a map and/or a list; 7) allowing the first user to send an alert to a second user displayed on the map and/or the list; 8) allowing the second user to change his or her status mode towards the first user based on the alert; and 9) allowing a two-way communication to be established between the first user and the second user when the second user changes the status mode to one that allows highest level of communication within the multiple status modes.

These and other features, aspects and advantages of the present invention will become better understood with reference to the following drawings, description and claims.

DETAILED DESCRIPTION OF THE PREFERRED EMBODIMENT(S) AND INVENTION

Figure 1:
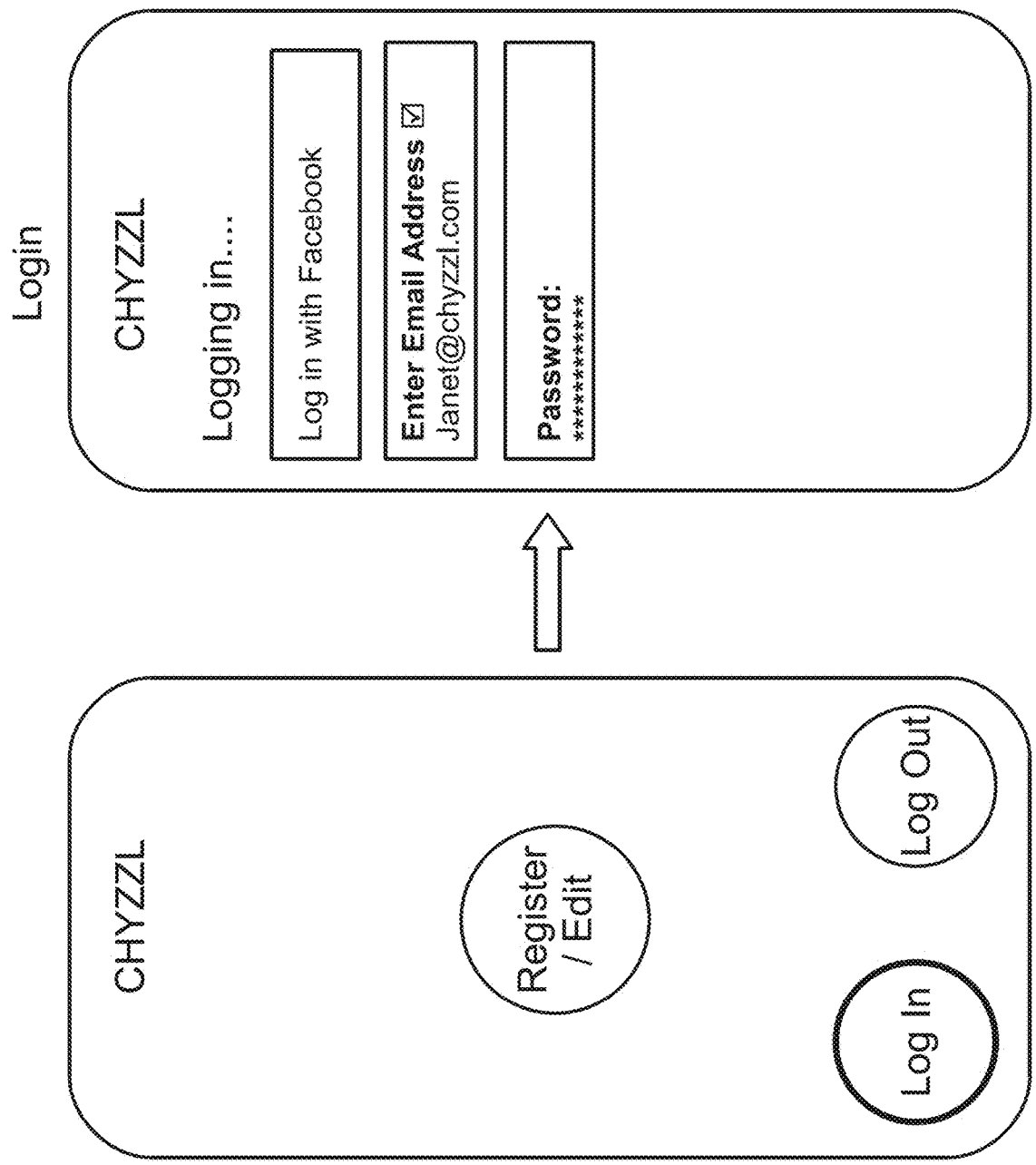
FIG. 1 is a schematic diagram according to an exemplary embodiment of the present invention.

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

For purpose of the present disclosure, the term "Emoji" generally refers to a small digital image or icon used to express an emotion, in electronic communication. The term "Medoji" stands for "Media Emoji", which can be any file format including but not limited to one or any combinations of the following; Text, Art Clip, GIF, Emoji, device vibration, Touch, Smell, Voice, Music, Audio, Animation, Movie, Snippet, picture, drawings and any other existing or future Media. Medojies are provided by the disclosed application in a Medoji bank. Further, the term MEdoji in the present disclosure is also used as an avatar portraying the user with different emotions or in different settings or specific outfit etc. The term "Fantoji" stands for "Fantasy Emoji", which is an animation or any other motion picture, that includes either or both corresponding users, depicting them, in this case, their MEdojies, as characters in a motion scenario, for instance; a serenading scene. This feature could be part of the MEdoji app, and can be imported to be used by Chyzzl. In some embodiment, Medoji and Fantoji scenarios are provided by the disclosed application and users can use avatar profile pictures to substitute for the faces of the characters, or a resemblance feature created by the app can be used. The term "Chyzzl" is used to indicate an action of breaking the ice, which can be repeated until the highest status of communication is reached. This action is portrayed through specially designed Medojies for this purpose. For instance, to Chyzzl someone, or someone has been chyzzled, means, that a special Medoji is sent or has been received.

Broadly, embodiments of the present disclosure generally relate to a platform and a method that facilitates breaking the ice and communication between users who are not acquainted from before and have no previous knowledge of each other. In one embodiment of the present disclosure, the platform comprises: a non-transitory computer-readable storage medium comprising programmable instructions adapted to be executed on one or more processors, and to perform a method of: allowing users to register and create their own profiles on a platform server; enabling each user to select one of multiple status modes at the platform server, where each status mode dictates a certain action or counteraction that can be taken by other user or users, and each status mode allows different level of communication to be established between the users; allowing each user to select whether he or she can be detected by others; allowing a first user to select criteria of users he or she wants to break the ice with (or meet); detecting users who can be detected and who meet the first user's selected criteria within a specified range or condition and displaying them on a map and/or a list; allowing the first user to send an alert to a second user displayed on the map and/or the list; allowing the second user to change his or her status mode towards the first user based on the alert; and allowing a two-way communication to be established between the first user and the second user when the second user changes the status mode to one that allows highest level of communication within the multiple status modes. A user's profile typically will include name, date of birth, age, gender, sexual orientation and/or interest/hobby of the user, so that the first user can select or customize the type of person he or she wants to meet based on the information available in each user's profile (e.g., a specified gender, age range, interest etc.). The system can further create alerts and notifications to inform users as to the proximity of another user with specific interests, such as, age range, hobby, collage, etc. The non-transitory computer-readable storage medium comprising programmable instructions may further allow the user to select one of two function modes at the platform server, where each function mode establishes the nature of interaction between two users, namely, friendship and romance. A friendship tag can be used in the case that the interest is not romantic, when starting to break the ice.

The alert may be an Emoji, Medoji or Fantoji as defined above, or as simple as a text or combination of these. The platform server may offer some Emoji, Medoji or Fantoji for free and others purchasable. For instance, Emoji, Medoji or Fantoji that are more unique and provides more interactions, must be purchase by the user before the user can use them. It could be that Emoji, Medoji and Fantoji that have to be purchased will provide user with better application experience than the free ones. It also allows operator of the social networking application to obtain additional revenue.

In one embodiment, the map is displayed to the first user through a mobile electronic device such as mobile phone and tablet operated by the first user, or a potable console. Depending on the system/user setting, the map may only show users who are within the eyesight of the first user or users who are within a specified distance of the first user (not necessarily within the eyesight of the first user). The detection performed can be automatic or manual depending on the users' preference. Automatic detection allows the first user to be notified whenever any user that matches the first user's search criteria is in proximity with the first user (e.g., within the eyesight of the first user); whereas for manual detection, the first user must press certain search button on the application interface for the detection to be performed. In general, automatic detection increases the first user's chance of meeting users fitting his or her criteria whereas the manual detection allows less power to be consumed by the mobile device.

In yet another embodiment, each user within the platform can be depicted by a virtual avatar on the platform server that resembles the user's real face. For example, the virtual avatar's face can be a picture of the user or a resemblance feature created by the platform server. the term MEdoji can be a substitute for avatar in the present disclosure and the avatars can interact with each other under different scenario. In a more advanced version, MEdojies can interact within a scenario named Fantoji.

In yet another embodiment, the platform server provides at least five levels of status modes: first level status mode, second level status mode, third level status mode, fourth level status mode and fifth level status mode. Further, these modes are tagged with at least two function modes to distinguish the level of interest. For example, these function modes can be friendship and romance. In one setting, the "Romance" mode is always assumed (i.e., set as default) unless the modes are tagged with "Friendship", through options provided. The first level status mode allows least communication between the first user and the second user, and the fifth level status mode allows maximum communication between the first user and the second user. For example, the first level status mode does not allow any communication to be established between any users including Chyzzl. Users can change their status mode, in general or towards each other, to dictate what level of communication to be established. Optionally, the application can also be programmed in a way that users may change their status mode, generally towards each other, to any lower level they want, but can only increase one level at a time. For instance, if two users are in third level status mode, one of them may change the status mode to first or second at any time they want, but they can only change to level four status mode from level three status mode. Further, function modes are interchangeable. Two MEdojies that are friends at the beginning, can change their mode from "Friendship" to "Romance", and vice versa. Or a Secret Admirer (discussed below) can change his or her status to CHIPPED (discussed below) to reveal himself or herself. Melted avatars discussed below can change their relationship from Romance to Friendship and vice versa, or change their status to either FROZEN or ICEBERG.

In yet another embodiment of the present disclosure, the first user and the second user can interact in a fantasy world, participating in activities or play games in a virtual environment (VR). This function can be permitted after the highest level of communication has been established, and a certain time has passed thereafter. For example, the first user and the second user can play 2D/3D VR games together.

In yet another embodiment of the present disclosure, Function modes within the platform server further includes a secret admirer mode. When the secret admirer mode is being turned ON by a user, the user will be able to be detected by secret admirers and to receive an alert, preferably special secret admirer Medojies, from secret admirers. After the user receives the alert from the secret admirer, the user has the option of responding to the alert (i.e., sending a Chyzzl Medoji), and a communication is established between the user and the secret admirer, whereby the admirer can send Medojies and Fantojies, and the admired can keep on sending a Chyzzl Medoji. When the secret admirer mode is being turned OFF, the user will not be detected by any secret admirer and will not receive any secret admirer alert.

In yet another embodiment of the present disclosure, the platform server further includes a system safeguard where users will not be able to detect each other under certain condition(s), or only a certain age group are allowed to interact. For example, the system safeguard may set a rule that, 7 to 10 years old can only detect each other, or teenagers can only be able to detect each other. Thus, a 30-year-old user will not be shown on a 16-year-old user's map or Avatar list, and vice versa. Another way a system safeguard can be implemented, is by allowing different age groups to have access to Medojies, Fantojies and VR games and fantasy worlds, that are appropriate for their age group. System safeguards are fixed and cannot be altered by the users.

In yet another embodiment of the present disclosure, the disclosed application further includes a push notification function. This allows the application to notify a user of new messages or events even when the user is not actively using the application or when the application is closed. For example, when the user's electronic device receives a push notification, the application's icon and a message may appear in the status bar. The notification can be turned ON or OFF by the user at any time through the application's settings or the user's profile. If the push notification is ON, the user will receive a push notification in real time notifying the user whenever someone sends the user an alert (e.g., text, Medoji or Fantoji) or an invitation to participate in events (e.g., VR games). The notification can be a text, sound, device vibrations, music, image, animation, or combination thereof.

FIGS. 1 to 14 are exemplary screenshots for the mobile application of the present disclosure according to one embodiment. Here, a social networking application, called Chyzzl the Ice Breaker App (hereafter "Chyzzl"), is being introduced intending to be used as a means of communication between its users. The app can be downloaded through Chyzzl's website and other electronic App stores, and can function over a variety of smartphones and tablets or any other popular electronic device, including a portable console. The main purpose of the app is to facilitate "breaking the ice" between two users that are in view site of each other, who are not acquainted from before and have no previous knowledge of each other. This ability can also be extended to subscribers that are not necessarily in view sight of each other, but are on the network map based on the subscribers' distance and other criteria. Note that the term "Chyzzl" used here may also refer to the action of sending a message, Medoji or Fantoji to someone depending on the context. For instance, to Chyzzl someone or someone has been Chyzzled means a message, Medoji and/or Fantoji has been exchanged between two users.

Figure 2:
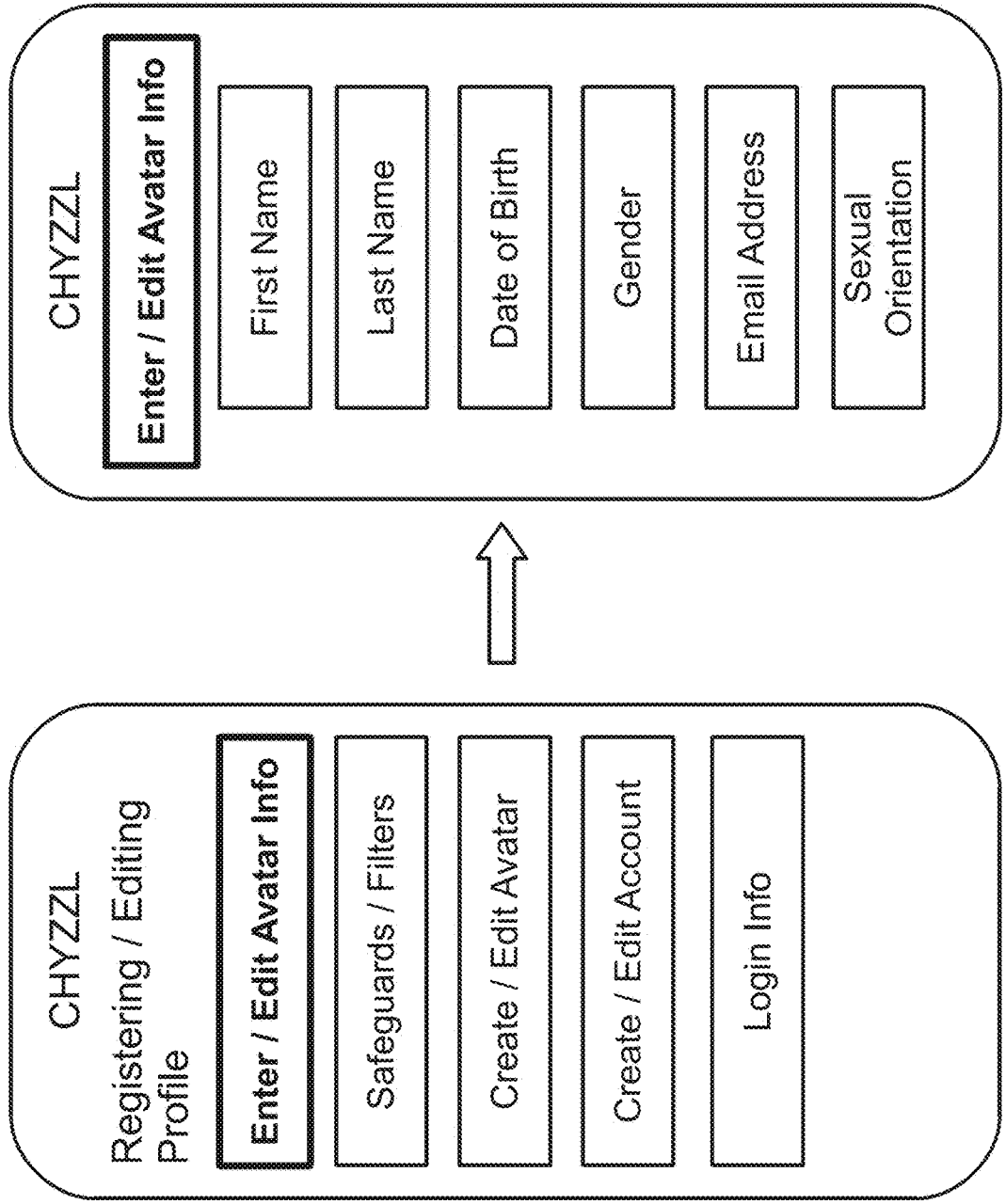
FIG. 2 is a schematic diagram according to an exemplary embodiment of the present invention.
Figure 3:
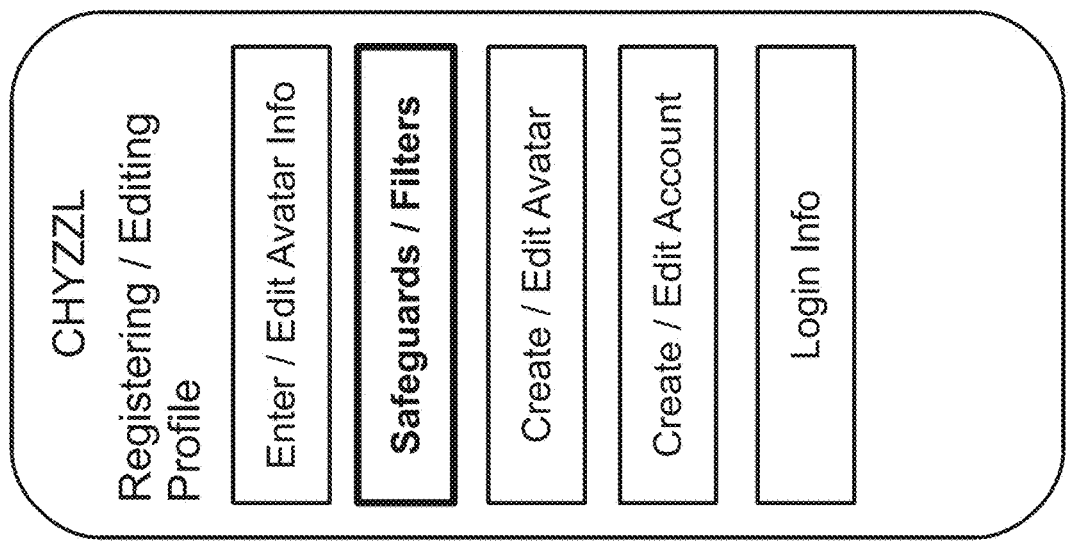
FIG. 3 is a schematic diagram according to an exemplary embodiment of the present invention.
Figure 4:
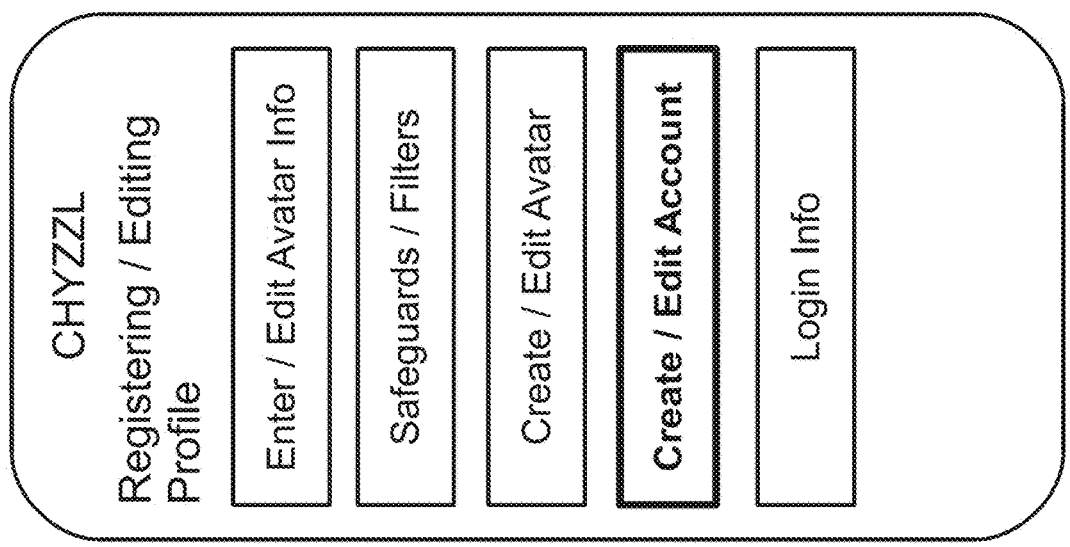
FIG. 4 is a schematic diagram according to an exemplary embodiment of the present invention.
Figure 5:
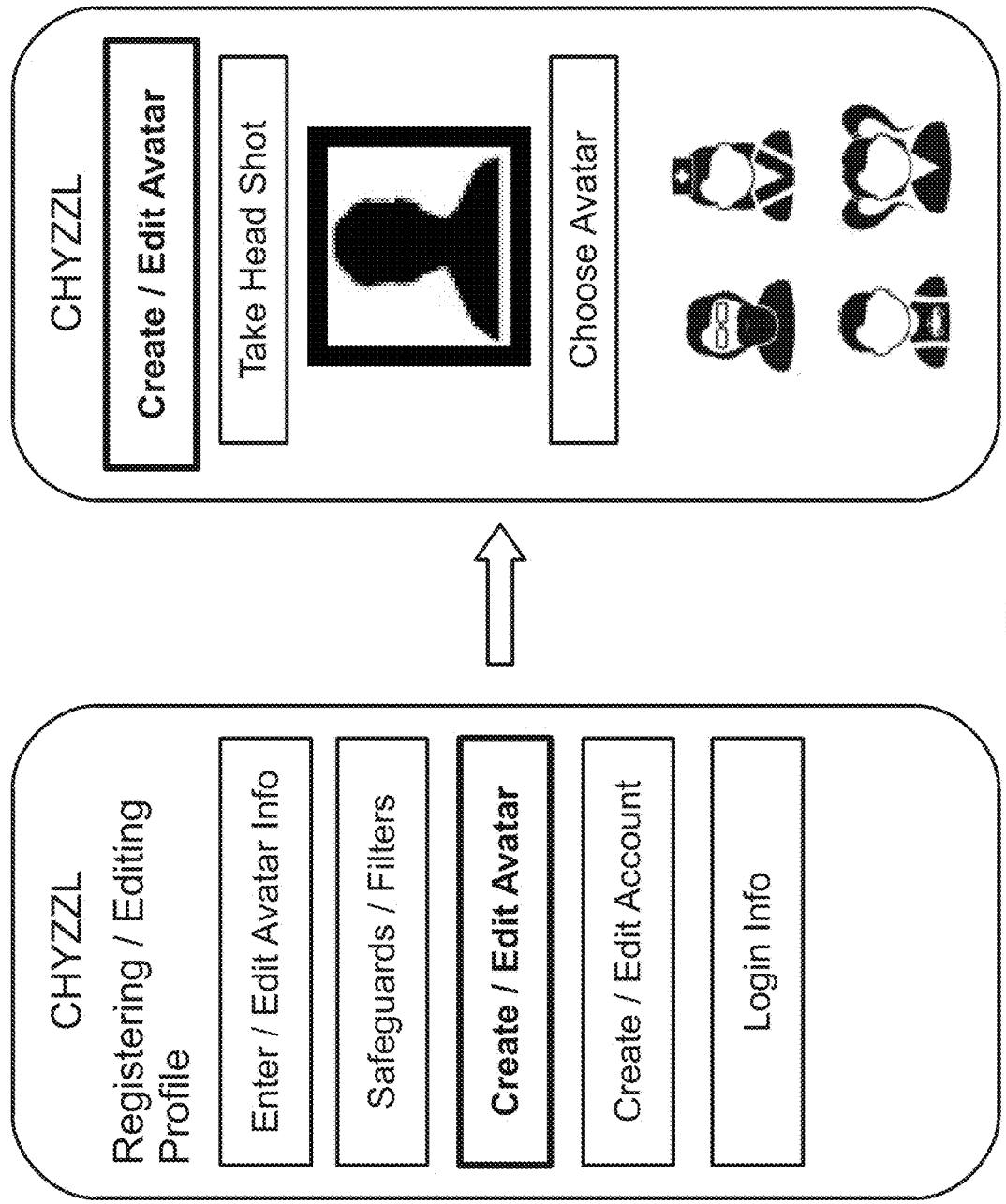
FIG. 5 is a schematic diagram according to an exemplary embodiment of the present invention.

FIG. 1 shows an exemplary login screen for the disclosed mobile application. Here, the user may choose to log in with existing social network accounts such as Facebook®, or log in with email (or username) and password created by the user. If the user selects registering a new account, the user will be brought to a registering/editing profile section as shown by FIG. 2. Here, the user may enter/edit information (i.e., name, date of birth, gender, email, sexual orientation etc.) regarding the user's Avatar, the user may also select or set safeguards filters (e.g., filter by age and/or sexual orientation etc.) as shown by FIG. 3, create and edit account (e.g., watch ads, set notification, input credit information etc.) as shown by FIG. 4, and create/edit appearance of Avatar as shown by FIG. 5.

In this embodiment, there are three embedded functions in the app, namely, SECRET ADMIRER, VIRTUAL REALITY and FRIENDSHIP Modes. SECRET ADMIRER mode allows a person to secretly admire another, in view sight, or in other settings, be able to secretly admire another user of the app within a certain distance criteria. The SECRET ADMIRER function can also be a separate and independent app that can be linked to Chyzzl. In the VIRTUAL REALITY mode, users can interact in a fantasy world or situation, or play a game. FRIENDSHIP mode explains the nature of interest between two users and is implemented through a tag.

There are certain things that can be done in this function mode, for instance; group chat, friend introduction and other group or friends activity, or even VR.

The application facilitates breaking the ice and communication between its users through series of actions and counteractions, by the users, which create different Status and Function Modes between them. Each Status mode dictates a certain action or counteraction that can be taken by the two users in correspondence. Status Modes are established by sending that Status Mode's Medoji and notification alert.

Here, users can be represented in any available digital formats. A simple form would be a MEdoji/AVATAR, which has the real face of the user that can be easily identified by others. For example, the avatar can be a simple picture, or it can be an actual character with the actual picture of the user's face or a resemblance feature created by the application. These avatars can perform an action that best describe their character or interest and hobbies. MEdojies can be used to create an Avatar or other new or existing applications can be deployed. In the case of a Secret Admirer, the avatar can be a generic character provided by the app. The application may also use a special Medojie to represent the Secret Admirer.

In yet another embodiment, there are five Status Modes and three Function Modes. The Status Modes are ICEBERG, ICE, FROZEN, CHIPPED and MELTED, and the Function Modes are SECRET ADMIRER (SA), VIRTUAL REALITY (VR) and FRIENDSHIP (FR). Other Status Modes can be created and added as necessary. The goal of the user is to take the person he or she is interested in, from ICE status to MELTED, at which time, they both can communicate through; TEXT, Medoji and Fantoji, anytime, anywhere. This process first starts by sending a Chyzzl Medoji to other users with ICE status. Notifications in the form of alerts which includes the Medoji, are sent and received by corresponding parties. The following are the descriptions of the status modes, which are the building blocks of the application.

ICEBERG: this status does not allow any communications; no Medoji can be received. It could be looked at as "Do Not Disturb Mode". There is a standard Medoji associated with ICEBERG status that can be switched on as a general mode, so as not to be disturbed by anyone, or can be sent specifically to another user, to block receiving any further communications from that user. This status can be changed at any time to Frozen. Users can pick any detectable avatar in ICE Mode and change their own status to ICEBERG without sending any notification. This is to ensure that anyone can block communications from any detected avatar they choose, at any time.

ICE: This is the status of all detected avatars who have never been Chyzzled (i.e., receiving a notification such as Chyzzl Medoji) by the interested party. ICE as a general Mode is a sign of being "breakable." It can also be a status change from ICEBERG through Manage Avatar List and Detected Avatars. (This is when changing from do not disturb as a general mode and not after communication has been established. If communication is established the ICEBERG Status can be changed to FROZEN only) There is a standard Medoji associated with ICE mode/status. Avatars in ICE mode can only be Chyzzled.

FROZEN: This status is used in respond to a Chyzzl which indicates the party in receiving a Chyzzl is not currently interested or cannot currently respond, but is leaving the doors open for further initiations by the interested party. Avatars who do not respond to a Chyzzl, also go under the FROZEN list, automatically. When in radar the avatar will show in the FROZEN list and an Alert can be generated to notify of the presence of the avatar. There can be a change of status from ICEBERG to FROZEN. Avatars in CHIPPED and MELTED modes can also change their status to FROZEN. There are standard or custom Medojies associated with FROZEN status. Avatars in FROZEN mode can only be Chyzzled.

CHIPPED: This status is used in response to a Chyzzl which indicates the party in receiving a Chyzzl is also interested. It can be a status change from ICE or FROZEN in response to receiving a Chyzzl from the interested party. This status will open the doors for the interested party, to be able to send any available Medoji and Fantoji in their bank including Chyzzl. Avatars in Chipped mode can change their status to FROZEN or ICEBERG at any time. Further CHIPPED can be a change of status by a Secret Admirer, in response to a Chyzzl. There are standard Medojies associated with CHIPPED status.

MELTED: This status is used in response to a Chyzzl and can only be generated by a CHIPPED avatar, only. It will allow 2 way communications between the two interested parties, anytime, anywhere, and not just under the radar. TEXT, Medoji and Fantojies can be inter exchanged. Avatars in Melted status can invite each other to a Virtual Reality game or fantasy world. This can be done by sending a VR invitation Medoji and is possible when a certain amount of time, dictated by the app, is spent in the MELTED status, between two avatars. There are standard or custom Medojies associated with MELTED status. Melted status enables users to be able to use all possible interactions available within the app, including exchange of a wide range of Medojies and Fantogies that can only be used in this status, Virtual Reality games and Custom Fantasy Worlds. Melted Status can be changed to Frozen or Iceberg at any time.

SECRET ADMIRER (SA): This Function Mode can be switched ON or OFF. It can also be switched OFF in response to receiving a notification. If switched OFF, no unidentified avatar can send messages. Generally, an interested party can initiate contact by sending a SECRET ADMIRER notification which includes the associated SA Medoji. If the SECRET ADMIRER receives a Chyzzl Medoji back in response, it will facilitate for the Admirer to be able to send Medoji and Fantojies that are specially designed for this mode. SA communication can be done anywhere, anytime. The admired avatar can keep on sending Chyzzl, until the Admirer decides to reveal himself, by changing his status to CHIPPED. The admired can also change his/her status to ICEBERG to stop any further communications at any time.

VIRTUAL REALITY (VR): This Function Mode allows two avatars to interact in a fantasy world or play a game. Only Avatars in MELTED mode between them, can do this and the process starts by one Avatar sending a VR invitation to the other. For example, there can be imbedded software application that facilitates creation of Fantojies and VR scenarios with MEdojies as characters. In addition, the disclosed application can include a feature that facilitates making Fantojies and virtual reality games between specified MEdojies. For example, at some point users can order their own scenarios to be custom made, which can be a certain Fantoji, depicting an interaction between two users or a group of friends. The system that runs the present disclosure can be equipped with a mini production team, by whom, MEdojies will be put in a scenario, initiated by the user's order or request. Scenarios can be predesigned templates, or can be directed or specifically requested by the users. This ultimately would be a fully automated procedure, where by a software program is used to incorporate specified or given MEdojies within a specified scenario. This Feature can be a separate and independent application of its own, which only facilitates the production of custom made VR and Fantasy worlds, where by the product can be imported and be used by Chyzzl app, namely, the Medoji app. Optionally, the application may allow the user to make such productions within the disclosed application, rather than ordering it to the production team.

FRIENDSHIP: This Function Mode explains the nature of interest between two users and is implemented through a tag. There are certain things that can be done in this function mode, for instance; group chat, friend introduction and other group or friends activity, or even VR.

Figure 6:
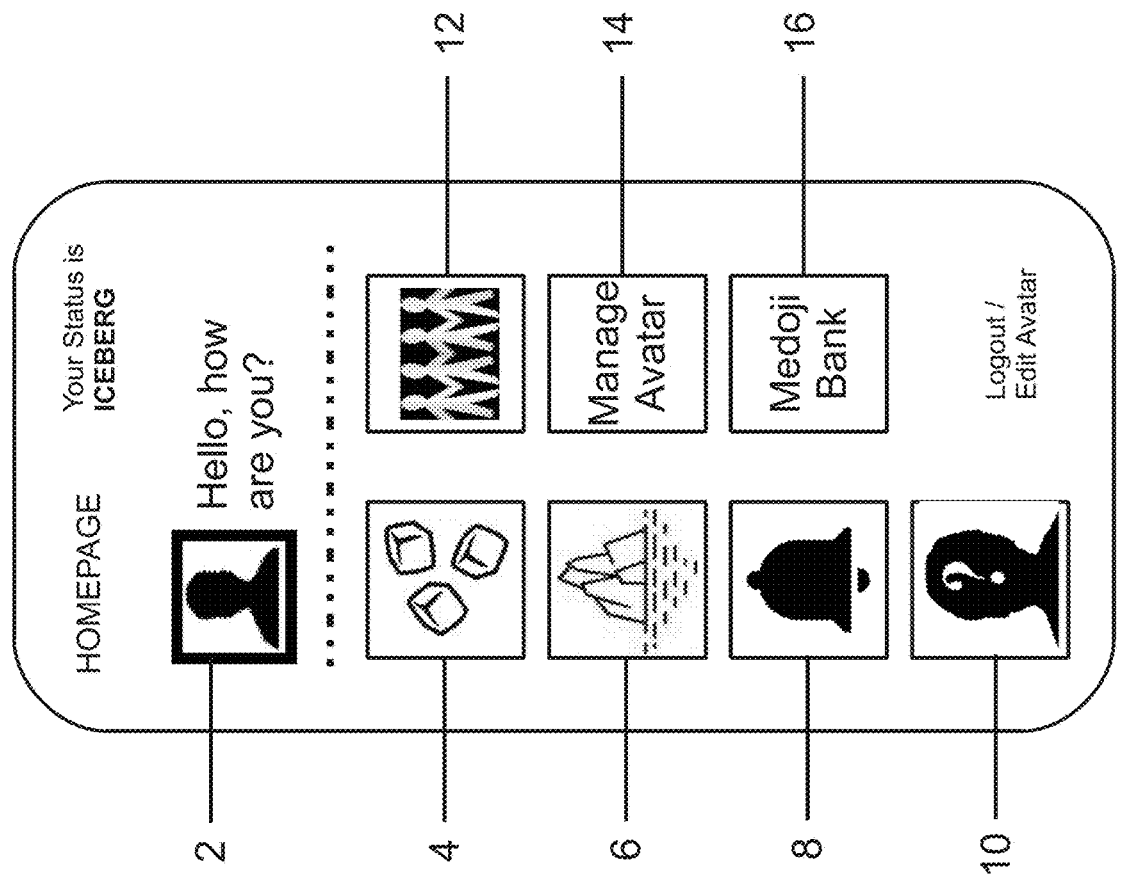
FIG. 6 is a schematic diagram according to an exemplary embodiment of the present invention.

FIG. 6 is an exemplary homepage screen for the mobile application. Here, the homepage comprises features such as Real Time Message 2, ICE Mode 4, ICEBERG Mode 6, Notification Mode 8, Secret Admirer Mode 10, and also quick links to Friend Activity 12, Manage Avatar 14 and Medoji Bank 16. Real Time Message 2 can be rotating notification that include incoming text and beacons. Every time a new message comes in real time, it will trigger a special sound, like a notification sound, and optionally a vibration depending on the user's setting. Here, when a feature is turned on, its icon will glow so that the user knows the feature is ON. For example, the ICE Mode 4 can be switched ON by touching the icon, and it means the user is detectable. Similarly, for ICEBERG Mode 6, which can be activated by touching the icon as well. When ICEBERG Mode is glowing, it means do not disturb and/or undetectable by others. Only one of ICE Mode 4 and ICEBERG Mode 6 can glow at a time. When Notification Mode 8 is activated (i.e., when it glows), it means the user can receive alerts while not logged in (i.e., the user allows message to be received through push notification or other communication means). When Secret Admirer (SA) Mode 10 is ON, it means the user can receive SA MEdoji. The Friend Activity 12 icon provides a quick link for the user to have activity with friends. For instance, when the link is pressed, it will display a list of all user's friends. Then the user can choose a friend to: introduce to another friend, to create a group chat, or to play games together. Manage Avatar 14 icon takes user to Avatar edit page, and Medoji Bank 16 icon takes user to user's Medoji Bank.

Figure 7:
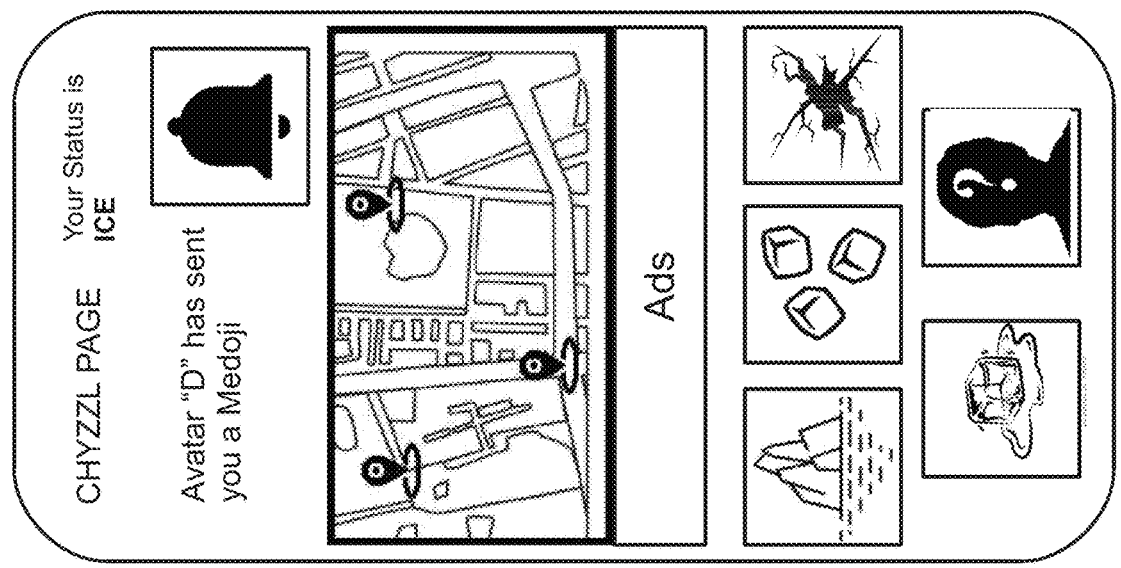
FIG. 7 is a schematic diagram according to an exemplary embodiment of the present invention.
Figure 8:
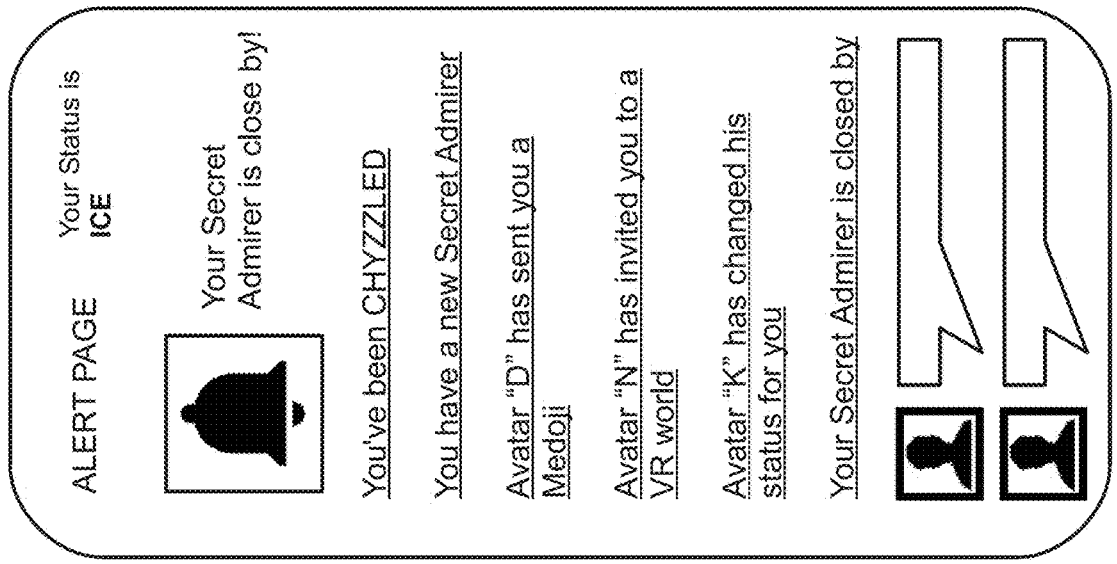
FIG. 8 is a schematic diagram according to an exemplary embodiment of the present invention.

FIG. 7 is an exemplary Chyzzl (or user search) page. Here, the page comprises a map that displays close by users. Below the map, the user will be able to select and filter the map by status (e.g., ICEBERG, ICE, CHIPPED, MELTED, SECRET ADMIRER etc.). User can also click on the target to see more information about the target. Further, advertising and In-App purchases may also be available and used here in Chyzzl. In one embodiment, a way to get FREE packages of Medojies and other tools used in Chyzzl, is to have the users view advertising, either measured in duration, or by the number of individual Ads. The Ads may be displayed below the map or anywhere feasible. This provides a win win situation both for the subscribers of Chyzzl and the advertiser who are using Chyzzl to reach their market. FIG. 8 is an exemplary alert page, where it displays a list of alerts the user has received. The user may click the alert to respond, or to reply the message in dialog boxes.

Figure 9:
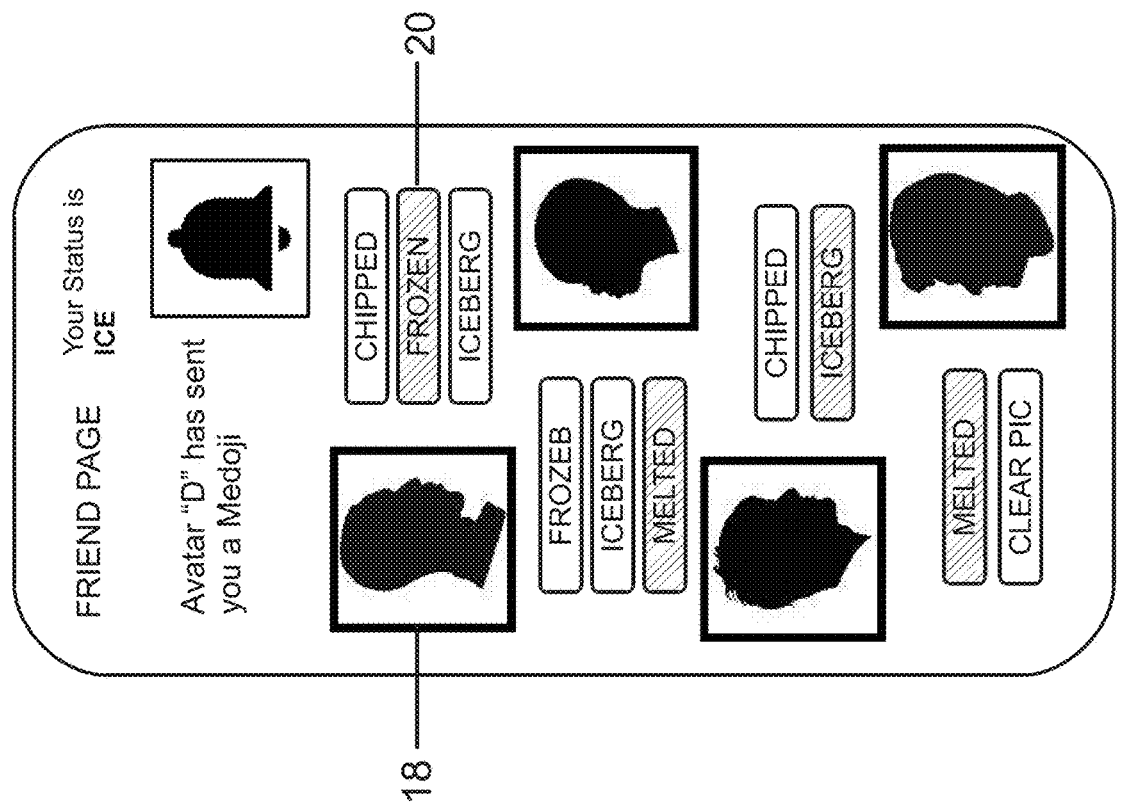
FIG. 9 is a schematic diagram according to an exemplary embodiment of the present invention.

FIG. 9 shows an exemplary Friends/Users' Status Page where it displays the status of user's friends and/or other users in relation to the user. For example, User A 18 has a current status of ICE, but the user can click the status icons on the right of User A 18 to change User A's 18 status in relation to the user (e.g., of the user clicks on the FROZEN icon 20, User A's 18 ICE status will change to FROZEN). There are many ways to display the status of each friend or user. For example, instead of taking the user to a different page when a friend is selected, the color around the Avatar (or photo) of user's friend will change to the chosen status (e.g., blue for ICE, very dark blue for FROZEN etc.). At the same time, other status options may go fade or disappear if they are no longer required. The page may also display who the user secretly admires and who has Chyzzled the user in response to user's SA Medoji. There will be no status change if the user remains in SA mode. However, if the user chooses MELTED mode, the user will reveal his or her identity. Optionally, the user may also reveal his or her identify by clearing his or her distorted picture little by little.

Figure 10:
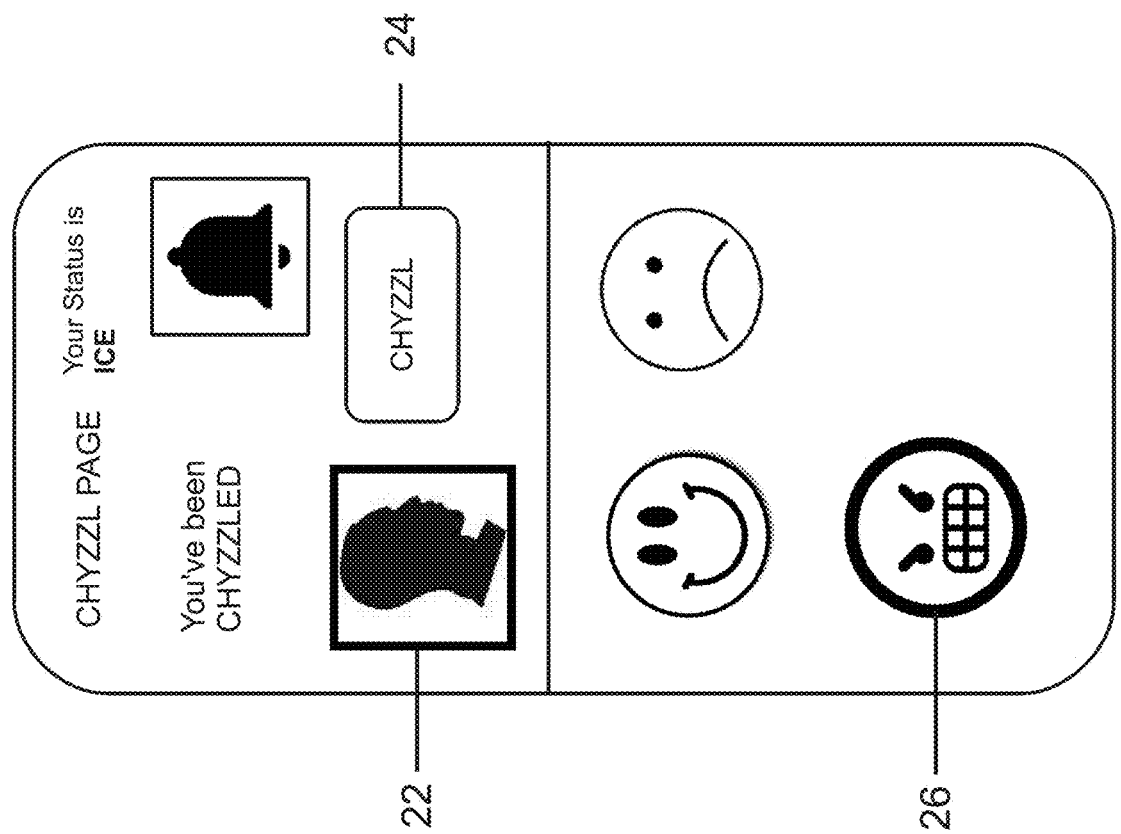
FIG. 10 is a schematic diagram according to an exemplary embodiment of the present invention.

FIG. 10 is an exemplary Chyzzl (e.g., message) page. The Avatar 22 has changed his status to CHIPPED in response to the user's Chyzzl. When the user goes to this page by choosing either the alert notification or seeing Avatar 22 on the map and touching the avatar, the user can either send Chyzzl by touching the Chyzzl icon 24 (when glowing means Chyzzl sent), or sending him motivational special Chipped status Medojies 26 (e.g., tap twice on Medoji to send) until Avatar 22 changes his status to melted. Status can only be changed in response to a Chyzzl Medoji. Special Medojies get loaded automatically. Avatar can purchase Medoji at this point if not available, or through Medoji Bank in home page.

Figure 11:
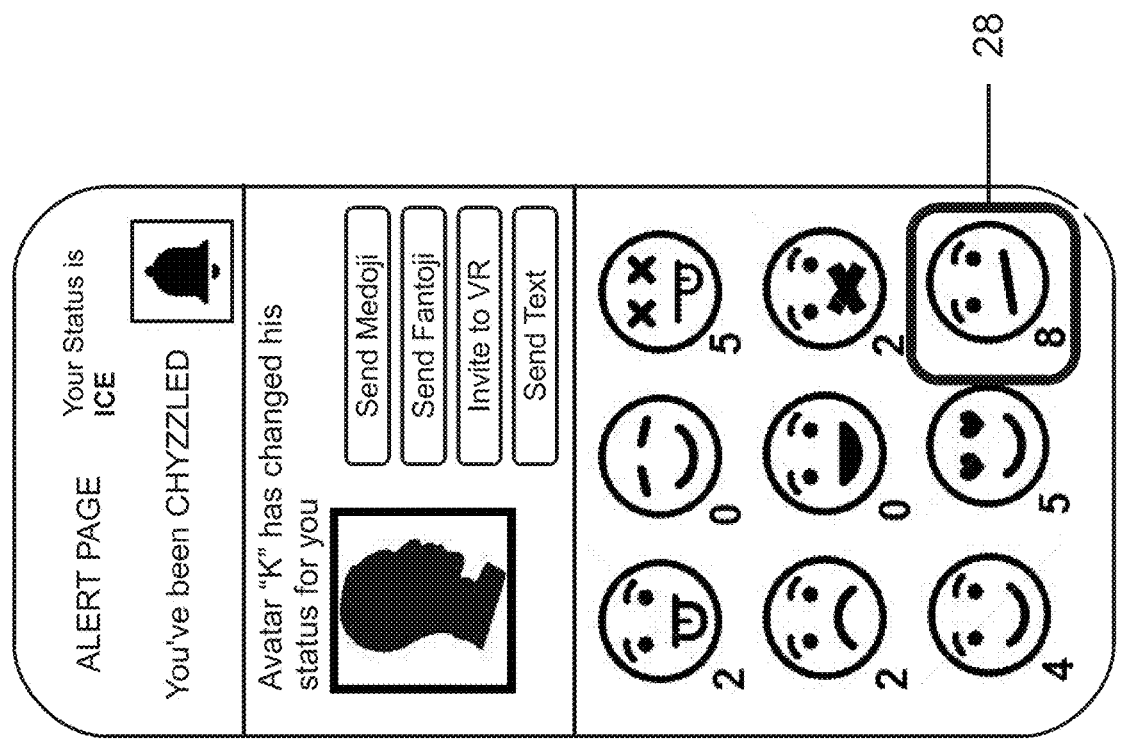
FIG. 11 is a schematic diagram according to an exemplary embodiment of the present invention.

FIG. 11 is another exemplary page for sending Medoji or Fantoji to someone else in the Melted Status. The user will be taken to a page where he can choose "Send Medoji", "Send Fantoji", "Invite to VR" and "Send Text". If the user clicks on Send Medoji, the Medoji list will load at the bottom of line, if click on Send Fantoji, the Fantoji list will load at the bottom of the line (user may double tap on Medoji to send). In one embodiment, a number is displayed at the corner of each Medoji or Fantoji which represents the number of times a corresponding Medoji or Fantoji can be used or the number of times a corresponding Medoji has exceeded its usage (will display in different color). For example, each time a Medoji is sent the corresponding number changes to one less. When zero and faded with no color, user will be given a chance to send that Medoji. This can be done a specified number of times (e.g., 10) only before the system will ask the user to watch an ad to compensate for the negative. The chosen Medojies can be accumulated throughout the app and is reflected on all unavailable Medojies. In this example, the user has already sent unavailable Medoji 28 (e.g., overuse) 8 times. Now if the user sends another unavailable Medoji with NUMBER 0, it will turn its NUMBER 0 into 9 and YELLOW Shadow. The other unavailable Medoji 28 with number 8 will be updated to number 9. This means if the user sends another unavailable Medoji, for example an unavailable CHIPPED Medoji, all three Medojies will be updated to Number 10. The system locks the Medoji Bank at this point. The system will then prompt the user to watch a specified amount of add to unlock sending Medojies, through an Alert. Optionally the user can go to Manage Medoji Bank in Home page to purchase available packages.

Figure 12:
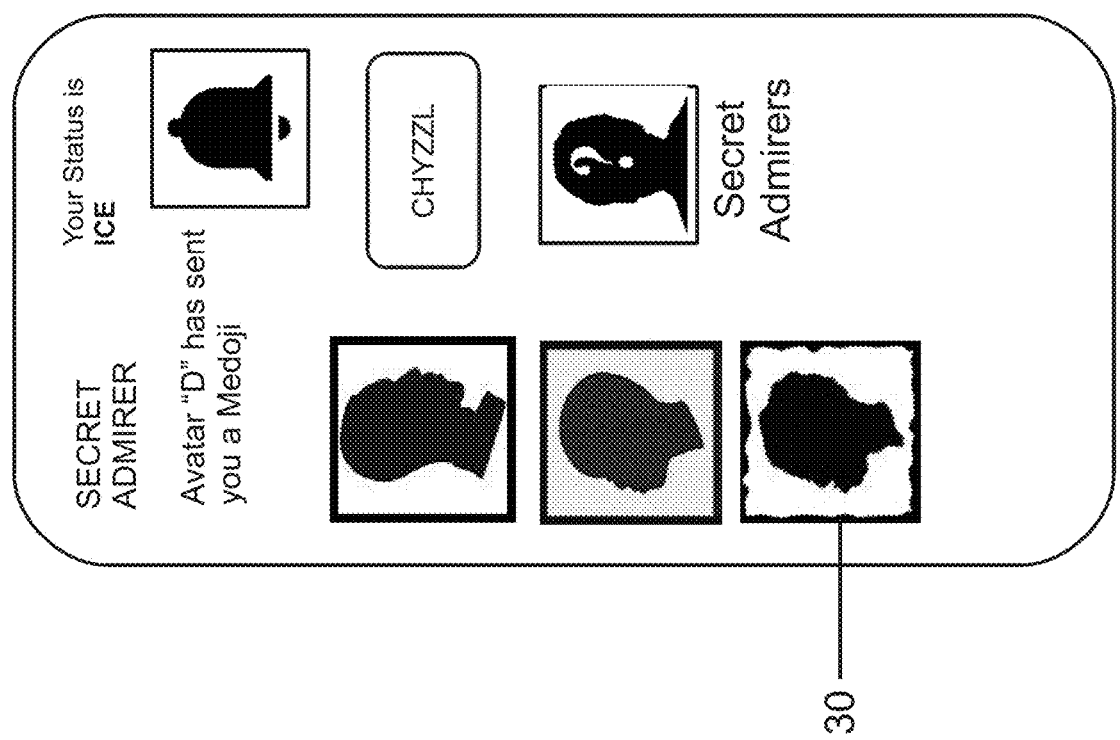
FIG. 12 is a schematic diagram according to an exemplary embodiment of the present invention.

FIG. 12 is an exemplary Secret Admirer (SA) page. Here, a user can send Chyzzl to invite his or her secret admirer to reveal him/herself. The icon may glow when Chyzzl is sent. The user can also touch the SA icon to block receiving SA Medoji from a particular admirer. If the user does nothing, the secret admirer will be allowed to continue admiring and the Chyzzl icon remains flat and not glowing. In addition, secret admirers will have the option of showing their photos in different style, pixel or clarity. For example, secret admirer displayed by avatar 30 looks distorted and unrecognizable. Little by little the admirer can make his or her avatar clearer until the reveal. This can be done in response to user's Chyzzl sent. Alternatively, secret admirer can also be represented as a frosted ice cube that gradually changes shape to frozen, chipped and ultimately melts to reveal the avatar inside. All these can happen in response to a Chyzzl sent by the secretly admired.

Figure 13:
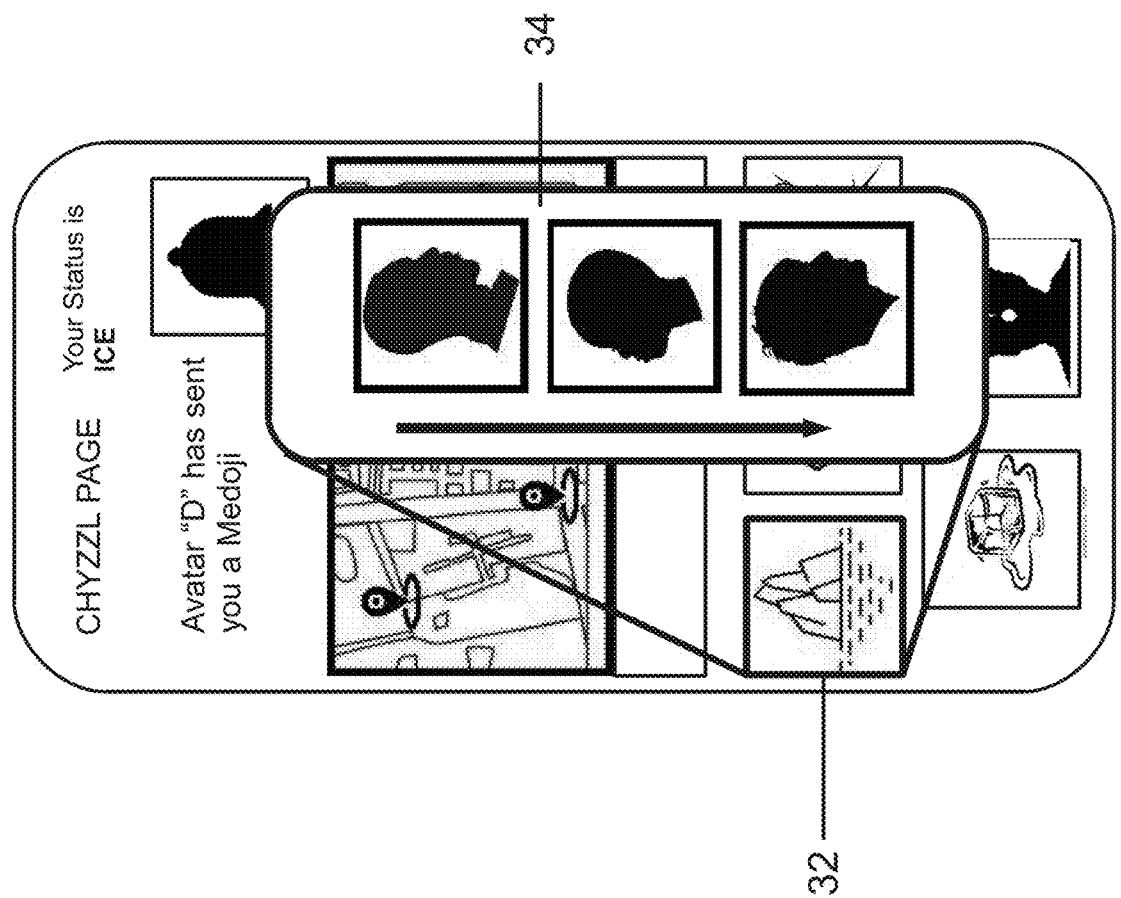
FIG. 13 is a schematic diagram according to an exemplary embodiment of the present invention.
Figure 14:
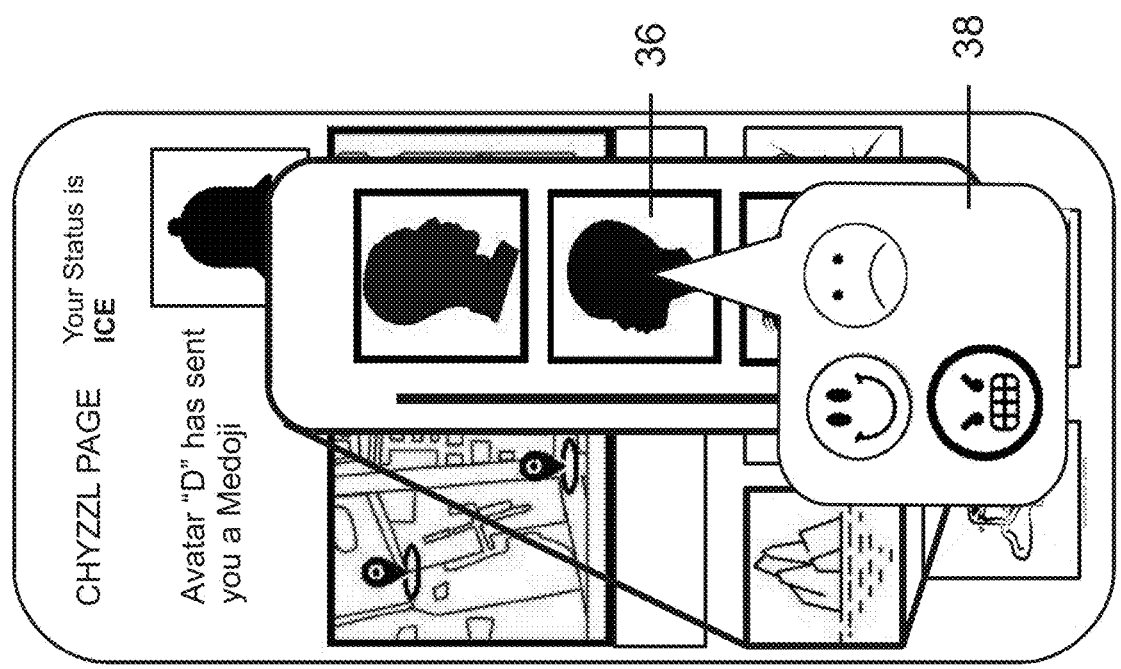
FIG. 14 is a schematic diagram according to an exemplary embodiment of the present invention.

FIGS. 13 and 14 are another exemplary Chyzzl pages. Here, the user can filter the map based on the status of nearby users. For instance, the user can click on the Iceberg Icon 32, and a list 34 will pop up showing avatars whom the user has changed his or her status to Iceberg for. The user may also have an option to change his or her status to Frozen which will allow those users to send the user Chyzzl (e.g., tap twice to change to Frozen). As shown by FIG. 14, the user may also tap on the avatar 36 to open Medoji bank 38 and double tap on the Medoji to send. Once the Medoji is sent, the user will automatically be taken back to the avatar list.

In yet another embodiment of the present disclosure, different software or mobile application is designed for different age of people. For instance, a separate application (e.g., "Chyzzl Kids") can be designed targeting kids up to a certain age (e.g., 9 years old etc.).

In yet another embodiment of the present disclosure, a portable console is created to either interact with or run the software (i.e., the mobile application) of the present disclosure. For example, there will be a Chyzzl portable console together with Chyzzl gadgets and accessories, that will facilitate the mobile application and its games. Separate or different consoles can be designed for teenagers and adults respectively. These consoles are merely different in design and each gives access to different kinds of allowable functions, such as games, Fantoji and Medoji Banks, that are created for the users in that age group. The consoles may include hologram Display, as part of visual effect, where users receive their alerts and Fantojies in a 3D manner.

Further, the console could further include Sensory Bank (e.g., touch, sound and smell). These effects can be already programmed in a Medoji/Fantoji, or can be tagged on as a rider, for a custom effect. For instance, sense of smell can be integrated in the delivery of Medojies and Fantojies, through the Chyzzl console which is equipped with a Smell bank, which is triggered when receiving the alerts, or certain Medojies or Fantojies. For instance, if graphics of a flower is sent. The receiving console will emit the associated flower smell from the Smell Bank. The sense of smell can be added to the custom-made scenarios as well.

The idea is to integrate all senses including but not limited to hearing, visual, touch and smell, into the Fantojies, Medojies and the virtual reality games. For instance, in receiving a Frozen Medoji, the receiving console can get cold and a sound of wind can be heard, with a smell of Arctic see! Either Medojies and Fantojies come with a fixed preprogrammed sensory integration, or, users can choose and compile a special effect by using the touch, sound effect and smell banks, to create a custom alert or Fantoji. Users will have the option to open each of these banks and tag their Medoji or Fantoji with any of the available senses, and this will intern be interpreted and implemented by the receiving console.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A system platform server having a non-transitory computer-readable storage medium comprising programmable instructions adapted to be executed on one or more processors of the system platform server and to perform a method of:

receiving registration information from a plurality of users, where registered users are provided with access to the system platform server through their mobile devices;

detecting and tracking the registered users' locations through their mobile devices when the registered users access the system platform server through their mobile devices;

receiving search criteria from a first user that is accessing the system platform server through the first user's mobile device, where the search criteria instructs the system platform server to search for users who match the search criteria in the system platform server's database;

causing users who match the search criteria and are within a specified distance of the first user to be displayed by photos or avatars on a map or a list generated on the first user's mobile device;

providing the first user with an option to select one of five status modes towards a second user shown on the map or the list through the first user's mobile device, wherein first status mode is set as default which does not allow the first user's mobile device to receive initial notifications from the second user's mobile device, second status mode allows the first user's mobile device to receive an initial notification from the second user's mobile device only if the second user has never sent a previous notification to the first user before, third status mode allows the first user's mobile device to receive additional notifications from the second user's mobile device if the second user has sent a previous notification to the first user before but the first user has not responded to the second user's previous notification, fourth status mode causes an alert to be sent from the first user's mobile device to the second user's mobile device to make the second user aware that the first user shows interest in the second user and is only available after the second user responds to the alert sent by the first user's mobile device, and fifth status mode allows the first user's mobile device to establish direct text or call communication with the second user's mobile device and the first user is given permission through the first user's mobile device to invite the second user to participate in an activity in a virtual environment and the fifth status mode cannot be selected until the first user and the second user have designated each other at the fourth status mode;

wherein in selecting the status mode for the second user, the first user can only select a status mode that is one level higher or any level lower than the second user's current status mode, where the first status mode represents the lowest level, and fifth status mode represents the highest level;

wherein each of the registered users are depicted by a virtual avatar or photo on the system platform server that resembles the user's real face;

providing the first user with an option to select a secret admirer mode through the first user's mobile device, wherein when the secret admirer mode is switched ON by the first user, the first user can receive and send notifications specifically designed for the secret admirer mode to and from a second user;

causing the second user's photo or avatar to reduce in pixel or clarity on the first user's mobile device so the first user sees the second user's photo or avatar in blurry form on the first user's mobile device when the first user receives a notification specifically designed for the secret admirer mode from the second user indicating that the second user is a secret admirer.

2. The system platform server of claim 1, wherein the activity is to play a virtual reality game.

3. The system platform server of claim 1, wherein the initial notification, the additional notification and the previous notification comprises an image or a sound or a combination of both but is not a text message or direct call.

4. The system platform server of claim 1, wherein the initial notification, the additional notification and the previous notification is a small digital image or icon (emoji) used to express an emotion, and is one or any combinations of text, art clip, GIF, emoji, voice, Device Vibration, smell, touch, music, animation, movie, audio, snippet, picture, drawings, 3D art, Hologram and any other existing and future media.

5. The system platform server of claim 1, wherein the pixel or clarity of the photo or avatar of the second user who is the admirer increases gradually on the first user's mobile device each time the first user receives a notification specifically designed for the secret admirer mode from the second user and responds to it by sending the second user a notification specifically designed for the secret admirer mode, or when the second user selects a status mode of the first user to a level higher to reveal the second user.

6. The system platform server of claim 1, wherein the mobile devices includes a sensory bank which is activated through the system platform server, which in turn activates a motion or releases a smell.

7. The computer-readable medium of claim 1, wherein the initial notification, the previous notification, and the additional notification further comprise custom alerts made by the first user.

8. The system platform server of claim 1, further comprising the first user unable to receive or Send notifications and detect location of a second user when the age difference between the first user and the second user exceeds a specified number.

9. A system platform server having a non-transitory computer-readable storage medium comprising programmable instructions adapted to be executed on one or more processors of the system platform server, and to perform a method of:

receiving registration information from a plurality of users, where registered users are provided access to the system platform server through their mobile devices, and they are depicted by virtual avatars or photos;

detecting and tracking the registered users' location through their mobile deices when the registered users access the system platform server through their mobile devices;

receiving search criteria from a first user that is accessing the system platform server, where the search criteria instructs the system platform server to search for users who match the search criteria in the system platform server's database;

causing users who match the search criteria and are within a specified distance of the first user to be displayed by photos or avatars on a map or a list generated in the first user's mobile device;

providing the first user with an option to select one of five status modes towards a second user shown on the map or the list through the first user's mobile device, wherein first status mode is set as default does not allow the first user's mobile device to receive initial notifications from the second user's mobile device, second status mode allows the first user's mobile device to receive an initial notification from the second user's mobile device only if the second user has never sent a previous notification to the first user before, third status mode allows the first user's mobile device to receive additional notifications from the second user's mobile device if the second user has sent a previous notification to the first user before but the first user has not responded to the second user's previous notification, fourth status mode causes an alert to be sent from the first user's mobile device to the second user's mobile device to make the second user aware that the first user shows interest in the second user and is only available after the second user responds to the alert sent by the first user's mobile device, and fifth status mode allows the first user's mobile device to establish direct text or call communication with the second user's mobile device and the first user is given permission through the first user's mobile device to invite the second user to participate in an activity in a virtual environment the fifth status mode cannot be selected until the first user and the second user have designated each other at the fourth status mode;

wherein the initial notification, additional notification and previous notification comprises an image or a sound or both but is not a text message or a direct call;

providing the first user with an option to select a secret admirer mode through the first user's mobile device, wherein when the secret admirer mode is switched ON by the first user the first user's mobile device is configured to receive and send notifications specifically designed for the secret admirer mode to and from a second users' mobile device;

causing the second user's photo or avatar to reduce in pixel or clarity on the first user's mobile device so the first user sees the second user's photo or avatar in blurry form on the first user's mobile device when the first user receives a notification specifically designed for the secret admirer mode from the second user indicating that the second user is a secret admirer; and wherein the pixel or clarity of the photo or avatar of the second user increases gradually on the first user's mobile device each time the first user receives a notification specifically designed for the secret admirer mode from the second user and the first user responds to it by sending the second user a notification specifically designed for the secret admirer mode, or when the second user selects a status mode of the first user to a level higher to reveal the second user.

10. The system platform server of claim 9, further comprising providing an option for the first user to select a second function mode on the first user's mobile device, wherein the second function mode causes the first user to notify others that the first user is only seeking friendship and is not looking for a relationship.

11. A portable console comprising:
   a sensory bank;
   a processor;
   a non-transitory computer-readable storage medium comprising programmable instructions adapted to be executed on the processor, and to perform a method of:
      providing a first user with access to a system platform server through a user interface on the portable console;
      detecting the first user's location through the portable console and sending the location to the system platform server;
      requesting the first user to enter search criteria describing the type of users whom the first user wants to meet and sending the search criteria to the system platform server;
      retrieving a search result from the system platform server and displaying users who match the search criteria in the system platform server's database and who are withing a specified distance of the first user on a map or a list generated by the user interface of the portable console;
      providing the first user with an option to select one of five status modes towards a second user shown on the map or the list through the first user's mobile device, wherein first status mode is set as default which does not allow the first user's mobile device to receive initial notifications from the second user's mobile device, second status mode allows the first user's mobile device to receive an initial notification from the second user's mobile device only if the second user has never sent a previous notification to the first user before, third status mode allows the first user's mobile device to receive additional notifications from the second user's mobile device if the second user has sent a previous notification to the first user before but the first user has not responded to the second user's notification, fourth status mode causes an alert to be sent from the first user's mobile device to the second user's mobile device to make the second user aware that the first user shows interest in the second user and is only available after the second user responds to the alert sent by the first user's mobile device, and fifth status mode allows the first user's mobile device to establish direct text or call communication with the second user's mobile device and the first user is given permission through the first user's mobile device to invite the second user to participate in an activity in a virtual environment and the fifth status mode cannot be selected until the first user and second user have each other at the fourth status mode;
   wherein the first user can select fifth status mode towards the second user only if both users have designated the fourth status mode,
   providing the first user with an option to select a secret admirer mode through the portable console, wherein when the secret admirer mode is switched ON by the first user, the first user can receive and send notifications specifically designed for the secret admirer mode to and from a second user,
   causing the second user's photo or avatar to deduce in pixel or clarity on the first user's portable console so the first user sees the second user's photo or avatar in blurry form on the first user's portable console when the first user receives a notification specifically designed for the secret admirer mode from the second user indicating that the second user is a secret admirer; and
   wherein the pixel or clarity of the photo or avatar of the second user increases gradually on the first user's portable console each time the first user receives a notification specifically designed for the secret admirer mode from the second user and responds to it by sending the second user a notification specifically designed for the secret admirer mode, or when the second user switches a status mode of the first user to a level higher to reveal the second user.

12. The portable console of claim 11, further comprises causing the sensory bank on the portable console to release a smell or activate a physical motion when notified by the system platform.

* * * * *